Figure 1:
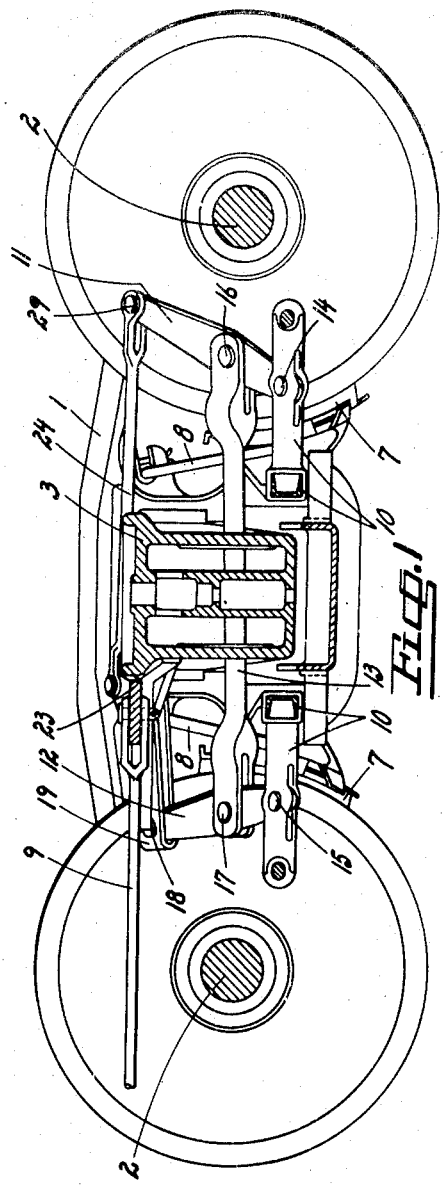

April 29, 1958

B. H. BROWALL 2,832,440

BRAKE GEAR CONSTRUCTION AND ARRANGEMENT IN RAILWAY CAR TRUCKS

Filed Dec. 30, 1953

3 Sheets-Sheet 3

INVENTOR
BERT HENRY BROWALL

United States Patent Office 2,832,440
Patented Apr. 29, 1958

2,832,440

BRAKE GEAR CONSTRUCTION AND ARRANGEMENT IN RAILWAY CAR TRUCKS

Bert Henry Browall, Malmo, Sweden

Application December 30, 1953, Serial No. 401,296

4 Claims. (Cl. 188—52)

This invention relates to brake gear construction and arrangement in railway car trucks.

The object of the invention is to provide an improved brake gear construction and arrangement in railway car trucks, particularly in four-wheel freight car trucks of American standard design.

A special object of the invention is to maintain the standard design and arrangement of the brake beams and the live and dead brake levers of the brake gear of a standard freight car truck substantially unchanged and, nevertheless, to provide for such a disposition of a point at which the brake gear of the truck is to be connected to a brake pull rod for the transmission of the force of the brake cylinder of the car to the brake gear of the truck during braking, that undesirable obliquity and non-uniform distribution of the reactions of the said heavy force on, for example, the wheel axle bearings of the truck will be avoided in an efficient manner and by simple means.

For the said objects and for such further objects as may appear from the following description, the invention consists in the construction, combination and arrangement of parts shown by way of example on the accompanying drawings illustrating a preferred form of the invention, and claimed in the appendant claims.

Figure 2:
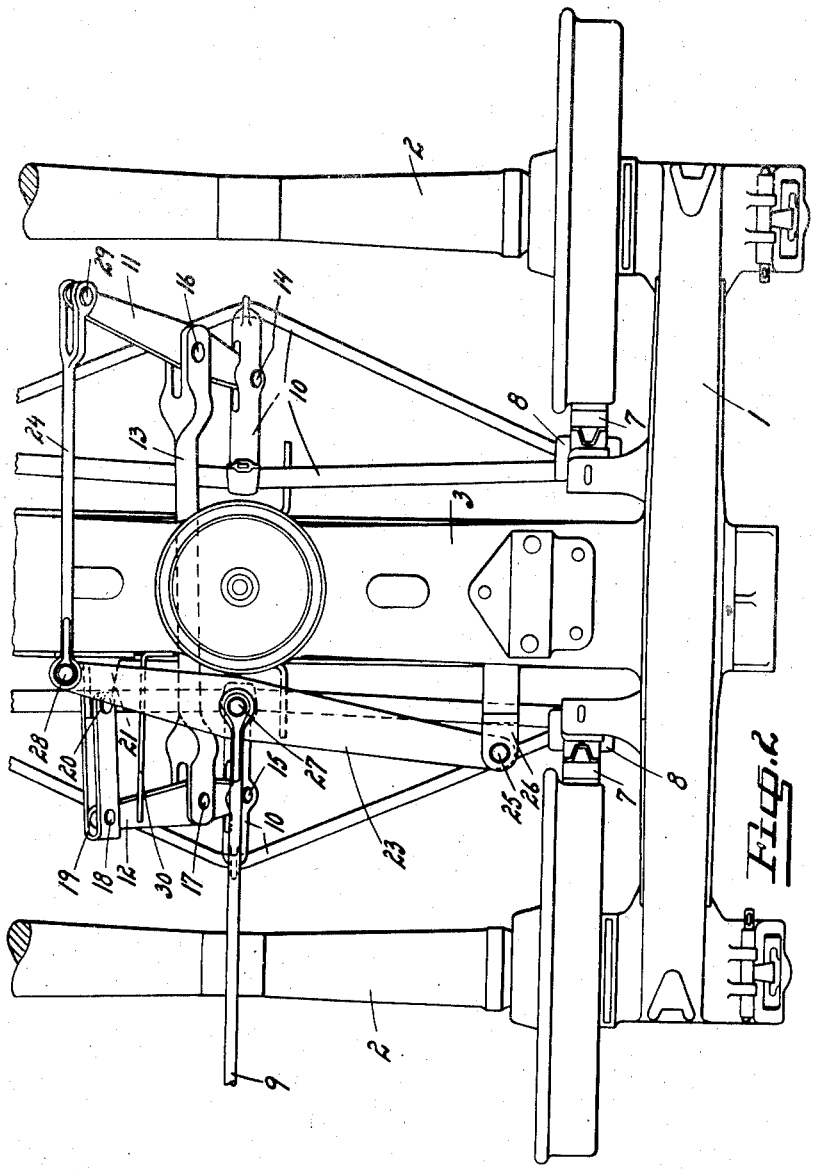
Figure 3:
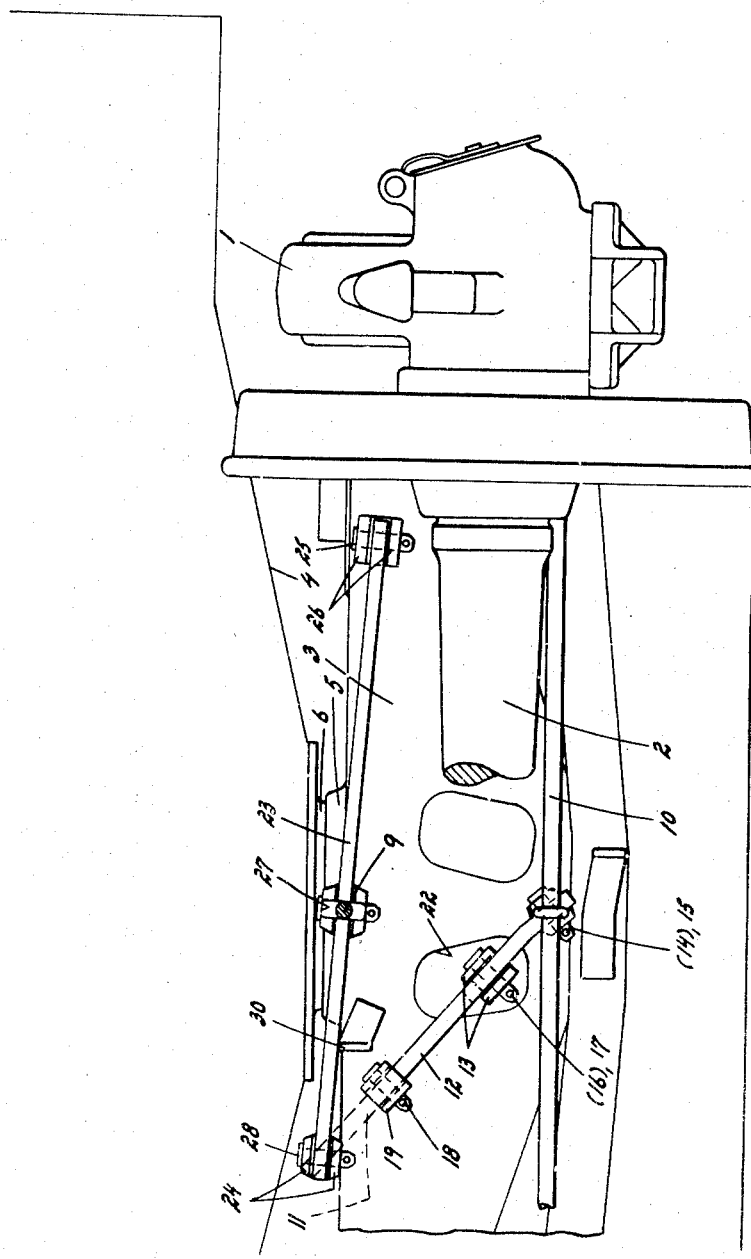

In the drawings:

Fig. 1 is a longitudinal vertical section of a railway freight car truck of American standard design, Fig. 2 is a plan view of part thereof, and Fig. 3 is a corresponding end view, partly in section.

The truck shown by way of example in the drawings for the elucidation of the invention comprises the usual side frames 1 and wheel axles 2 journaled in bearings in the side frames, and the usual bolster 3 resiliently supported from the side frames 1 and provided at its center with a center plate for the weight of the car body to rest on. In Fig. 3 the car body is indicated by the line 4, and as shown in Fig. 3 the car body rests on the truck center plate 5 by means of a body center plate 6 which together with the truck center plate 5 and the usual center pin or king bolt (not shown in the drawings) forms the so-called center bearing.

The brake equipment of the truck comprises the brake shoes 7 with their hangers 8 (Fig. 1), and the brake gear connecting the brake shoes to a main brake pull rod 9 extending underneath the car body and serving the purpose of transmitting the force of the brake cylinder mounted on the car body to the brake gear of the truck during braking. As the brake cylinder and the cylinder brake levers for the connection of the main brake pull rod 9 to the push rod of the brake cylinder form no part of this invention and may be of any conventional construction and arrangement, they are not shown on the drawings and will not be described in detail herein. The brake gear comprises the brake beams 10 to which the brake shoes 7 are attached, the live and dead brake levers 11 and 12, respectively, and their connection rod 13 which is a thrust rod. The live and dead brake levers 11 and 12 are connected at their one ends to the brake beams 10 by the pins 14 and 15, respectively, and intermediate their ends to the connection rod 13 by the pins 16 and 17, respectively. The other end of the dead brake lever 12 is fulcrumed by means of a pin 18 to a link 19 pivoted by means of a pin 20 to a fulcrum bracket 21 mounted on the bolster 3 on one side of the longitudinal centerline of the truck. The connection rod 13 extends longitudinally of the truck and transversely of the bolster through openings 22 (Fig. 3) therein. The axes of the pins 14 and 15 pivoting the live and dead brake levers 11 and 12 to the brake beams 10 extend in a plane inclined at an angle of 50° or thereabout from the vertical plane extending longitudinally of the truck through the center thereof, so that the levers 11 and 12, if disposed at right angles to the axes of the pins 14 and 15, respectively, extend and move in a plane inclined at an angle of 40° from the vertical plane extending longitudinally of the truck through the center thereof. Preferably, however, the levers 11 and 12 are bent adjacent their ends pivoted to the brake beams 10, so that the levers 11 and 12 to the greater part of their length extend and move in a plane inclined at an angle of more than 40°, say 48°, from the vertical plane extending longitudinally of the truck through the center thereof, as may be clearly seen from Fig. 3.

As far as described in the foregoing with reference to the drawings the brake gear of the truck is of substantially unchanged American standard design. With the standard design of the truck brake gear, the main brake pull rod, corresponding to the pull rod 9 shown, has to be disposed off center in relation to the longitudinal axis of the car and the truck and extends across and above the bolster 3 to the upper end of the live brake lever 11. This disposition of the main brake pull rod makes it necessary to provide for a relatively large clearance for the same between the underframe of the car body 4 and the bolster 3 of the truck, and moreover the off-center disposition of the main pull rod results in a powerful torsional moment being set up on the truck when braking, which in turn causes undesirable reactions on the wheel axle bearings and other parts of the truck, and a certain derailment tendency causing uneven wear of the wheel flanges.

These drawbacks are eliminated by the present invention according to which the pulling force of the main pull rod 9 is transmitted to the live brake lever 11 by means of an additional brake lever 23 in the form of a third class lever, which is fulcrumed to the bolster 3, and a pull rod 24 connecting the free end of the additional brake lever 23 to the live lever 11 at the end thereof to be pulled towards the fulcrumed end of the dead brake lever 12 on braking. In the construction shown on the drawings the additional brake lever 23 is fulcrumed by means of a pin 25 to a bracket 26 on the bolsters. The bracket 26 is mounted on the same side of the bolster 3 as the fulcrum bracket 21 for the dead brake lever 12, so that the said two brackets both project towards the end of the truck to be turned towards the center of the car, where the brake cylinder and the cylinder levers of the brake rigging are mounted on the car body and the fulcrum bracket 26 is on the other side of the longitudinal centerline from the fulcrum bracket 21 for the dead lever 12. The main pull rod 9 is linked to the lever 23 at a point between the ends thereof by means of a pin 27, and the pull rod 24 is linked at one end to the free end of the lever 23 by means of a pin 28, and at the other end to the live brake lever 11 by means of a pin 29.

As may be clearly seen from the drawings, the pull rod 24 connecting the live brake lever 11 to the additional brake lever 23 is disposed above the bolster 3 in the space between the latter and the car body 4. This implies that the live brake lever 11 and the additional brake lever 23 project up through and above the horizontal plane on the level of the upper side of the bolster 3. For this purpose the additional brake lever 23 is disposed and moves in a plane deviating somewhat from the horizontal. As may be seen from Fig. 3, the inclination of this plane need not be very large. As also may be easily gathered from the drawings there is ample space for the end of the main pull rod 9 connected with the additional brake lever 23 to partake in the resilient movements of the bolster and the additional brake lever 23 mounted thereon, in relation to the side frames 1 of the truck. Moreover, the clearance required for the pull rod 24 between the underframe of the car body 4 and the bolster 3 of the truck is relatively small. Furthermore, and this is the most significant feature of the invention, the construction, combination and arrangement of parts hereinbefore described and shown by way of example on the drawings provide for the possibility of disposing the main pull rod 9 in or very near the longitudinal vertical center plane of the car and the truck for the purpose of avoiding the creation of a torsional moment on the truck when braking and the consequent non-uniform distribution of the reactions of the heavy pulling force from the pull rod 9 on, for example, the wheel axle bearings and the wheel flanges.

Mounted on the bolster 3 is a guide plate 30 (Figs. 2 and 3) for the additional brake lever 23 to rest and glide on. Preferably this guide plate 30 is situated relatively near the free end of the additional brake lever 23.

What I claim and desire to secure by Letters Patent is:

1. In a railway car truck with brake gear of the character described, in which the truck comprises side frames, wheel axles journaled in the side frames, and a bolster resiliently supported from the side frames, the brake gear comprises brake beams, live and dead brake levers connected at their one ends to the brake beams, the dead brake lever being deaded at its other end on said bolster, and a connection rod to which the live and dead brake levers are connected at points intermediate their ends, the live and dead brake levers being disposed and moving in an inclined plane, and the connection rod of the live and dead brake levers extends longitudinally of the truck and transversely of the bolster through openings therein, the combination with said live and dead brake levers of an additional brake lever in the form of a third class lever, fulcrumed at one end to the bolster on one side of the longitudinal centerline of said truck, a pull rod connecting the free end of the additional brake lever on the other side of the longitudinal centerline of said truck to the live brake lever and extending above the bolster, and means intermediate the ends of the additional brake lever for the connection of a main brake rod thereto.

2. The combination claimed in claim 1, and the means for the connection of a main brake rod to the additional brake lever being disposed substantially in the longitudinal vertical plane through the center of the truck.

3. The combination claimed in claim 1, and fulcrum brackets for the dead brake lever and for the additional brake lever mounted on the same side of the bolster and both projecting towards that end of the truck which faces the center of the car.

4. The combination claimed in claim 1, and the additional brake lever being disposed in a plane inclined to the horizontal at a relatively small angle.

References Cited in the file of this patent

UNITED STATES PATENTS

| | | |
|---|---|---|
| 1,181,385 | Hedgcock | May 2, 1916 |
| 1,274,676 | Burton | Aug. 6, 1918 |
| 2,053,098 | Mills | Sept. 1, 1936 |
| 2,181,041 | Baselt | Nov. 21, 1939 |
| 2,215,239 | Baselt | Sept. 17, 1940 |
| 2,226,507 | Baselt | Dec. 24, 1940 |
| 2,684,130 | Goodwin | July 20, 1954 |